United States Patent
Petersen et al.

(10) Patent No.: US 10,907,862 B2
(45) Date of Patent: Feb. 2, 2021

(54) HIGH EFFICIENCY AIR CONDITIONING SYSTEMS AND METHODS

(71) Applicant: HONEYWELL INTERNATIONAL INC., Morris Plains, NJ (US)

(72) Inventors: Michael Petersen, Clarence Center, NY (US); Samuel F. Yana Motta, East Amherst, NY (US); Ankit Sethi, Buffalo, NY (US); Elizabet del Carmen Vera Becerra, Amherst, NY (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 16/410,190

(22) Filed: May 13, 2019

(65) Prior Publication Data
US 2019/0264956 A1    Aug. 29, 2019

Related U.S. Application Data

(63) Continuation of application No. 15/400,891, filed on Jan. 6, 2017, now abandoned.
(Continued)

(51) Int. Cl.
*F25B 1/053*     (2006.01)
*C09K 5/04*      (2006.01)
(Continued)

(52) U.S. Cl.
CPC ............. *F25B 1/053* (2013.01); *C09K 5/044* (2013.01); *C09K 5/045* (2013.01); *F25B 1/10* (2013.01);
(Continued)

(58) Field of Classification Search
CPC .......... F25B 1/053; F25B 40/00; F25B 45/00; F25B 1/10; F25B 2400/13; F25B 2400/23; F25B 2400/121; F25B 2400/12; F25B 41/003; F25B 31/026; F25B 9/006; C09K 5/045; C09K 5/044; C09K 2205/126
See application file for complete search history.

(56) References Cited

U.S. PATENT DOCUMENTS 5,136,854 A * 8/1992 Abdelmalek ........ B01D 53/002
                                                       60/651
2006/0242985 A1* 11/2006 Leck .................... B60H 1/3223
                                                      62/323.1
(Continued)

*Primary Examiner* — Emmanuel E Duke
(74) *Attorney, Agent, or Firm* — Colleen D. Szuch

(57) ABSTRACT

Disclosed are refrigeration systems having a heat source to be cooled and a heat sink and a capacity of from about 2 to about 30 tons and comprising: (a) a heat transfer composition comprising a refrigerant comprising at least about 80% by weight of trans1-chloro-3,3,3-trifluoropropene (HCFO-1233zd(E)) or at least about 80% by weight of trans1,3,3,3-tetrafluoropropene (HFO-1234ze(E)); (b) a centrifugal compressor having a discharge:suction pressure ratio at least about 2:1; (c) a condenser operating at temperature in the range of from about 10° C. to about 60° C.; (d) and expander for producing relatively cold low pressure refrigerant liquid; (e) a high efficiency evaporator; and (f) at least one heat exchanger fluidly connected between said evaporator and said refrigerant suction of said compressor.

20 Claims, 6 Drawing Sheets

Related U.S. Application Data

(60) Provisional application No. 62/275,382, filed on Jan. 6, 2016.

(51) Int. Cl.
  *F25B 40/00* (2006.01)
  *F25B 1/10* (2006.01)
  *F25B 45/00* (2006.01)

(52) U.S. Cl.
  CPC ............ *F25B 40/00* (2013.01); *F25B 45/00* (2013.01); *C09K 2205/126* (2013.01); *F25B 2400/12* (2013.01); *F25B 2400/121* (2013.01); *F25B 2400/13* (2013.01); *F25B 2400/23* (2013.01)

(56) References Cited

U.S. PATENT DOCUMENTS

| | | | | |
|---|---|---|---|---|
| 2008/0098755 A1* | 5/2008 | Singh | ............... | C07C 19/08 62/119 |
| 2010/0313582 A1* | 12/2010 | Oh | ............... | F25B 41/00 62/115 |
| 2011/0023507 A1* | 2/2011 | Yana Motta | ............... | C09K 3/30 62/115 |
| 2013/0263619 A1* | 10/2013 | Kapich | ............... | B60H 1/3222 62/238.4 |
| 2016/0024362 A1* | 1/2016 | Zhili | ............... | C09K 5/045 62/77 |

* cited by examiner

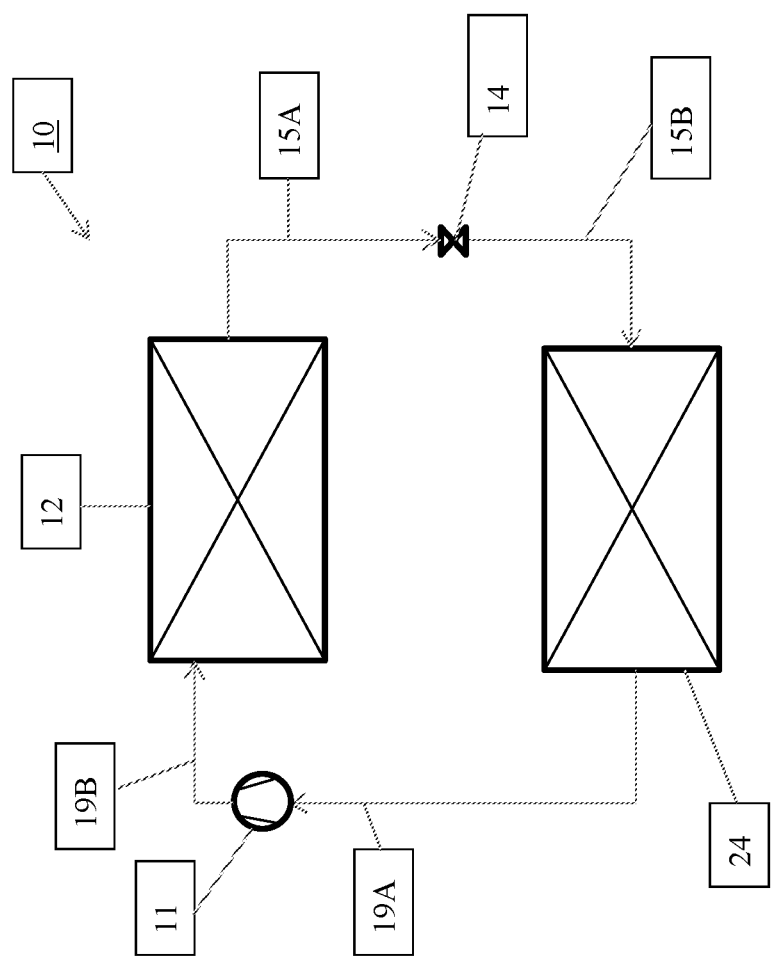
Figure 1A - PRIOR ART

HIGH EFFICIENCY AIR CONDITIONING SYSTEMS AND METHODS

CROSS REFERENCE TO RELATED APPLICATIONS

This application is a continuation of U.S. application Ser. No. 15/400,891, filed on Jan. 6, 2018, which is pending and claims the priority benefit of U.S. Provisional Application 62/275,382 filed Jan. 6, 2016, the entirety of each of which is incorporated herein by reference.

FIELD OF THE INVENTION

This invention relates generally to air conditioning systems and more particularly to such systems which utilize centrifugal compressors and have a refrigeration capacity in the range of up to about 30 tons.

BACKGROUND

Certain halogenated olefins, including the compounds 1-chloro-3,3,3-trifluoropropene (HFCO-1233zd) and 1,3,3,3-tetrafluoropropene (HFO-1234ze) have been suggested to use in vapor compression refrigeration systems. See U.S. Pat. No. 7,833,433. A standard vapor compression system is described in the '433 patent as including a compressor for compressing refrigerant vapor to produce a relatively elevated pressure and temperature vapor. An example of such a system is illustrated herein as Figure P. In such a system a refrigerant is introduced at a relatively low pressure into the suction side of a compressor 11 via a conduit 19A and a high pressure refrigerant is discharged and sent via conduit 19B to condenser 12. Heat is removed from this high temperature refrigerant vapor by condensing the refrigerant vapor in condenser 12 to produce a relatively high pressure liquid refrigerant which enters a conduit 15A. The relatively high pressure liquid then undergoes a nominally isoenthalpic reduction in pressure in an expansion device 14 to produce a relatively low temperature, low pressure liquid, which is then vaporized by heat transferred from the body or fluid to be cooled in evaporator 24. The low pressure vapor thus produced is returned to the suction side of the compressor via conduit 19A, thus completing the cycle.

The '433 patent suggests generally that the refrigerant compositions disclosed therein can be used in a variety of different cooling operations that employ a vapor compression system, including chiller systems that use centrifugal compressors. Typically, centrifugal chillers are large capacity systems, that is, systems having capacities greater than 50 tons. Most typically such systems are in the range of 50 to 150 tons of refrigerating capacity, with certain systems going as high as 8500 tons.

Applicants have come to appreciate that certain unexpected problems exist in connection with efforts to use transHFCO-1233zd and/or transHFO-1234ze in small capacity air conditioning systems that use high efficiency centrifugal compressors. As described in detail hereinafter, applicants have unexpectedly found that these problems can be overcome by utilizing one or more specialized configurations in the air conditioning system that allow the use of high efficiency equipment, including high efficiency compressors and evaporators, while at the same time overcoming the problems that applicants have recognized with the use of transHFCO-1233zd and/or transHFO-1234ze in such systems.

SUMMARY

Applicants have come to appreciate that it is highly desirable in many applications to provide low capacity air conditioning systems utilizing highly efficient centrifugal compressors and high efficiency evaporators. However, applicants have also come to appreciate that the use of refrigerant compositions comprising high percentages (e.g., above about 80% by weight) of HCFO-1233zd(E) or high percentages (e.g., above about 80% by weight) of HFO-1234ze(E), can pose serious problems for the reliability and/or effectiveness and/or efficiency of such systems.

For example, it is highly desirable in certain air conditioning systems to utilize a flooded evaporator because such heat exchange equipment allows a highly efficient heat transfer to the liquid refrigerant to occur. This highly efficient operation is due, at least in part, to the fact that in such equipment the heat transfer surfaces are essentially substantially covered by liquid refrigerant. However, as a consequence of using such highly efficient equipment, the vapor which exits from such an evaporator is essentially at saturated conditions, that is, possesses little or no superheat. This is an advantage from an efficiency standpoint, although it becomes especially important in such circumstances to ensure that the vapor which enters the compressor at or near saturation conditions does not condense. This is because the presence of such liquid refrigerant in the compressor will have negative consequences on the efficiency and/or the reliability of the compressor operation. Under typical operating conditions using other refrigerants, the use of saturated or near saturated refrigerant vapor at the compressor suction would not present a problem because during the nominal isentropic expansion that occurs in high-efficiency compressors heat is added to the refrigerant vapor and generates at least about 5° of superheat upon discharge from the compressor.

Applicants have come to appreciate, however, that problems will occur when using the preferred refrigerant compositions of the present invention in systems using high efficiency centrifugal compressors under conditions of the type that are preferred herein. More specifically, applicants have found that the preferred refrigerant compositions of the present invention will not under typical conditions produce the normal or expected amount of superheat during high efficiency compression. In fact, applicants have found that for highly efficient centrifugal compressor operation a "wet vapor" would be discharged from the compressor in the absence of the solution or solutions provided herein. As used herein, the term "wet vapor" refers to a vapor which has condensed liquid entrained therein. As is well known to those skilled in the art, the presence of such a vapor in the compressor can be highly detrimental to the efficient and or reliable operation of centrifugal compressors. Accordingly, applicants have found that use of the refrigerants according to the preferred aspects of the present invention can produce, in the absence of the present solutions, unexpected problems in the operation of high-efficiency centrifugal compressors, especially in applications which also utilize high-efficiency, low or no superheat evaporators. Nevertheless, applicants have also come to appreciate that it is highly desirable to operate such systems using the preferred heat transfer compositions of the present invention, since such operations are able to provide advantageous, environmentally friendly operation.

In order to overcome the problems and difficulties that applicants have come to recognize, one aspect of the present invention provides a refrigeration system of the type having a heat source to be cooled and a heat sink into which heat can be rejected, said system preferably having a capacity of from about 2 to about 30 tons and comprising:

(a) a heat transfer composition comprising a refrigerant comprising at least about 80% by weight of trans1-chloro-3,3,3-trifluoropropene (HCFO-1233zd(E)) or at least about 80% by weight of trans1,3,3,3-tetrafluoropropene (HFO-1234ze(E)), (b) a centrifugal compressor having: (i) a refrigerant suction for receiving a relatively low-pressure refrigerant vapor at a pressure of from about 40 to about 350 kPa and (ii) a discharge for discharging a relatively high pressure refrigerant vapor at a pressure wherein the discharge:suction pressure ratio is at least about 2:1;

(c) a condenser fluidly connected to said refrigerant discharge of said compressor for receiving at least a portion of said compressor discharge refrigerant vapor and condensing at least a substantial portion of said refrigerant vapor, and preferably substantially all of said refrigerant vapor, by heat transfer with said heat sink to produce a relatively high pressure refrigerant liquid at temperature in the range of from about 10° C. to about 60° C.;

(d) an expander fluidly connected to said condenser for substantially isoenthalpically reducing the pressure of said high pressure refrigerant liquid to produce low pressure refrigerant liquid at a pressure of from about 40 to about 350 kPa;

(e) a high efficiency evaporator, preferably a flooded evaporator, fluidly connected to said expander for receiving said low pressure refrigerant liquid from said expander and evaporating said low pressure refrigerant liquid by absorbing heat from said source to be cooled to produce a relatively low pressure refrigerant vapor at a pressure of from about 40 to about 350 kPa, said refrigerant vapor exiting from said evaporator preferably having no substantial superheat;

(f) at least one heat exchanger fluidly connected between said evaporator and said refrigerant suction of said compressor, said at least one heat exchanger receiving at least a portion of said low pressure refrigerant vapor from said evaporator and heating said low pressure refrigerant vapor to produce a low pressure refrigerant vapor having a temperature at least about 5° C. greater than the temperature of the vapor entering said at least one heat exchanger, said high temperature refrigerant vapor from said at least one heat exchanger fluidly connected to said compressor suction for providing low-pressure refrigerant vapor to said compressor.

As used herein, the term "capacity" defined in terms of number of "tons" refers to a heat transfer rate equivalent to the amount of heat required to melt one ton (2000 lb; 907 kg) of ice at 0 C (32 F) in 24 hours and generally equates to about 12,000 BTU/hour.

Other embodiments and aspects of the invention are disclosed below.

BRIEF DESCRIPTION OF THE DRAWINGS

FIG. 1A is an illustration of a prior art heat transfer system

DETAILED DESCRIPTION OF PREFERRED EMBODIMENTS

Preferred Heat Transfer Compositions

Figure 1:
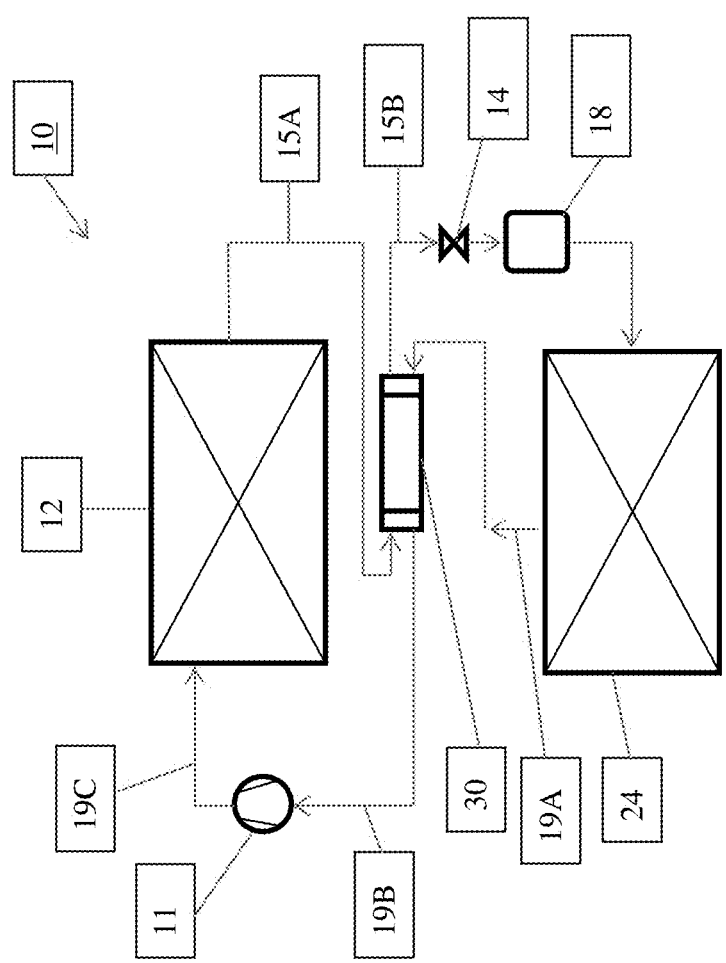
FIG. 1 is a generalized process flow diagram of one preferred embodiment of an air conditioning system according to the present invention.

In each of the embodiments described herein the system includes a heat transfer composition comprising refrigerant and preferably but not necessarily a lubricant for the compressor. Preferably the refrigerant comprises at least about 70% by weight, or at least about 80% by weight of trans1-chloro-3,3,3-trifluoropropene (HCFO-1233zd(E)) or of trans1,3,3,3-tetrafluoropropene (HFO-1234ze(E)), and is a low flammability and low toxicity refrigerant, preferably with a Class A toxicity according to ASHRAE Standard 2013 and a flammability of Class 1 or Class 2 or Class 2L according to ASHRAE Standard 34-2013 and described in Appendix B1 to ASHRAE Standard 34-2013.

In highly preferred embodiments, including embodiments of the type disclosed herein which include providing a flame suppression feature to the systems and methods, the refrigerant comprises at least about 95% by weight, and in some embodiments consists essentially of or consists of, HFCO-1233zd(E)

In other highly preferred embodiments, the refrigerant comprises from about 1% by weight to about 5% by weight of a five carbon saturated hydrocarbon, preferably one or more of iso-pentane, n-pentane or neo-pentane, and in preferred aspects of such embodiments the combination of said HFCO-1233zd(E) and said pentane is in the form of an azeotropic composition. Such azeotrope and azeotrope-like compositions are disclosed in U.S. Pat. No. 8,802,874, U.S. Pat. No. 8,163,196, and U.S. Pat. No. 8,703,006 , each of which is incorporated herein by reference. Heat transfer compositions of the present invention which include refrigerant compositions as described in this paragraph preferable include lubricant comprising or consisting of POE and/or mineral oil and/or alkyl benzene.

In highly preferred embodiments, including embodiments of the type disclosed herein which include providing a flame suppression feature to the systems and methods, the refrigerant comprises from about 85% to about 90% by weight of by weight of trans1,3,3,3-tetrafluoropropene (HFO-1234ze (E)) and from about 10% by weight to about 15% by weight of 1,1,1,2,3,3,3-heptafluoropropane (HFC-227ea), and even more preferably in some embodiments about 88% of trans1,3,3,3-tetrafluoropropene (HFO-1234ze(E)) and about 12% by weight of 1,1,1,2,3,3,3-heptafluoropropane (HFC-227ea). Heat transfer compositions of the present invention which include refrigerant compositions as described in this paragraph preferable include lubricant comprising or consisting of POE.

Those skilled in the art will appreciate in view of the disclosures contained herein that such embodiments of the present invention provide the advantage of utilizing only the relatively safe (low toxicity and low flammability) low GWP refrigerants, which make them highly preferred for use in a location proximate to the humans or other animals occupying a dwelling, as is commonly encountered in air conditioning applications.

The heat transfer compositions of the present invention generally include a lubricant. However, embodiments of the present invention include systems and methods which utilize compressors which do not require a lubricant and/or does not require the lubricant to be combined with the refrigerant. However, for those preferred embodiments in which the lubricant and refrigerant are included together as mixtures in one or more locations in the system, the lubricant is preferably present in the system in amounts of from about 30 to about 50 percent by weight of the heat transfer composition based on the total weight of the refrigerant in the system and the total weight of the lubricant in the system, with other optional components as described hereinafter also being possibly present. In preferred embodiments it is expected that heat transfer composition of the present invention, particularly in the form of the carry-over vapor from the compressor and in the form of the liquid from the condenser and entering the evaporator, comprises from about 97% to about 99.5% by weight of refrigerant of the present invention and from about 0.5 to about 3% by weight of lubricant, with such lubricant preferably being POE lubricant and/or, mineral oil lubricant.

Other optional components include a compatibilizer, such as propane, for the purpose of aiding compatibility and/or solubility of the lubricant. When present, such compatibilizers, including propane, butanes and pentanes, are preferably present in amounts of from about 0.5 to about 5 percent by weight of the composition. Combinations of surfactants and solubilizing agents may also be added to the present compositions to aid oil solubility, as disclosed by U.S. Pat. No. 6,516,837, the disclosure of which is incorporated by reference. Commonly used refrigeration lubricants such as Polyol Esters (POEs) and Poly Alkylene Glycols (PAGs), silicone oil, mineral oil, alkyl benzenes (ABs) and poly (alpha-olefin) (PAO) that are used in refrigeration machinery with hydrofluorocarbon (HFC) refrigerants may be used with the refrigerant compositions of the present invention. The preferred lubricants of the present invention are selected from POEs and mineral oils and alkyl benzenes.

SYSTEMS

The present refrigeration systems and methods are particularly well adapted for use in low capacity air conditioning systems, that is, systems having a capacity of 30 tons or less, particularly in residential air conditioning, particularly residential air conditioning having a capacity of from about 2 to about 5 tons, and commercial packaged rooftop air conditioning units, particularly having a capacity of from about 5 to about 30 tons.

EMBODIMENTS OF THE TYPE ILLUSTRATED IN FIG. 1

A preferred air conditioning system, designated generally at 10, is illustrated in FIG. 1. Such a preferred air conditioning system comprises compressor 11, condenser 12, evaporator 24 (preferably a flooded evaporator), expansion valve 14, and suction-line heat exchanger 30, together with any of the associated conduits 15A, 15B, 16A and 16B and other connecting and related equipment (not shown). In operation, the refrigerant according to the present invention is discharged from compressor 11 as a relatively high pressure refrigerant vapor, which may include entrained lubricant, and which then is transported via conduit 19C to condenser 12. In condenser 12 the refrigerant vapor transfers a portion of its heat, preferably via a phase change and preferably to ambient air, and produces an effluent stream comprising at least partially, and preferably substantially fully, condensed refrigerant. The refrigerant effluent from the condenser 12 is transported via conduit 15A to suction-line heat exchanger 30 where it loses additional heat to the effluent from the evaporator 24, as is explained more fully hereinafter. The effluent from the suction/liquid line heat exchanger 30 is then transported via conduit 15B to expansion valve 14 where the pressure of the refrigerant is reduced, preferably substantially isoenthalpically, which in turn reduces the temperature of the refrigerant. The relatively cold liquid refrigerant from the expansion valve 14 flows to receiver tank 18 which provides a reservoir of cold liquid refrigerant that is fed by way of a control valve (not shown) in conduit 19A into the evaporator 24 where it absorbs heat from the body or fluid being cooled, preferably the ambient air within a dwelling or other space being cooled. The refrigerant effluent vapor from the evaporator 24, which is preferably a substantially saturated refrigerant vapor with substantially no super heat (e.g. the superheat of the vapor leaving the evaporator is less than about 1° C. and more preferably less than about 0.5° C., and even more preferably of less than about 0.1° C.) is then transported via conduit 19A to the suction/liquid line heat exchanger 30 where it gains heat from the condenser effluent from conduit 15A and produces a refrigerant vapor at a higher temperature, which is transported by conduit 16B to the inlet of the compressor 11. In preferred embodiments, the vapor leaving the suction line heat exchanger has a temperature that is at least about 5° C., and even more preferably at least about 7° C., higher than the substantially saturated vapor which enters the suction line heat exchanger. The high temperature refrigerant vapor is then transported to the suction of the compressor 11 where it is compressed as described above.

In preferred embodiments in which the refrigerant comprises at least about 90% by weight, preferably consisting essentially of, and preferably consisting of, HCFO-1233zd (E), the operating conditions correspond to the values described in the table below:

| | | PREFERRED RANGE |
|---|---|---|
| COMPRESSOR SUCTION | Pressure, kPa | 45-75 |
| | Temperature, ° C. | 0°-10° |
| COMPRESSOR DISCHARGE | Pressure, kPa | 105-520 |
| | Temperature, ° C. | 20°-70° |
| CONDENSER | Pressure, kPa | 105-520 |
| | Temperature, ° C. | 10°-60° |
| EVAPORATOR | Pressure, kPa | 45-75 |
| | Temperature, ° C. | 0°-10° |

In preferred embodiments in which the refrigerant comprises at least about 80% by weight, HFO-1234ze(E), and even more preferably 88% by weight of HFO-1234ze(E) and 12% by weight of HFC-227ea, the operating conditions correspond to the values described in the table below:

|  |  | PREFERRED RANGE |
|---|---|---|
| COMPRESSOR SUCTION | Pressure, kPa | 210-310 |
|  | Temperature, ° C. | 0°-10° |
| COMPRESSOR DISCHARGE | Pressure, kPa | 420-1600 |
|  | Temperature, ° C. | 20°-70° |
| CONDENSER | Pressure, kPa | 420-1600 |
|  | Temperature, ° C. | 10°-60° |
| EVAPORATOR | Pressure, kPa | 210-310 |
|  | Temperature, ° C. | 0°-10° |

EMBODIMENTS OF THE TYPE ILLUSTRATED IN FIG. 2

Figure 2:
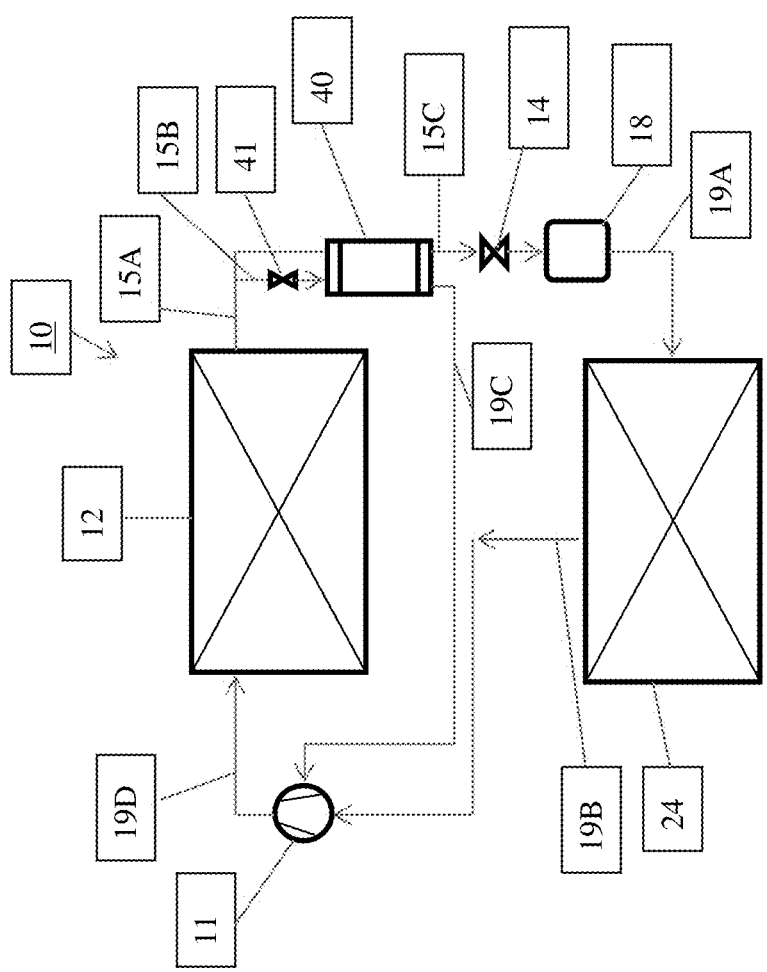
FIG. 2 is a generalized process flow diagram of another preferred embodiment of an air conditioning system according to the present invention.

A further preferred air conditioning system, designated generally at 10, is illustrated in FIG. 2. Such a preferred air conditioning system comprises a multi-stage compressor, shown as a two stage compressor 11, condenser 12, evaporator 24 (which is preferably a flooded evaporator in some embodiments), expansion valve 14, and vapor-injection heat exchanger 40, including associated intermediate expansion valve 41, together with any of the associated conduits 15A-15C and 19A-19D and other connecting and related equipment (not shown and/or not labeled). In operation, the refrigerant according to the present invention is discharged from compressor 11 as a relatively high pressure refrigerant vapor, which may include entrained lubricant, and which then is transported via conduit 19D to condenser 12. In condenser 12 the refrigerant vapor transfers a portion of its heat, preferably via a phase change and preferably to ambient air, and produces an effluent stream comprising at least partially, and preferably substantially fully, condensed refrigerant. The refrigerant effluent from the condenser 12 is transported via conduit 15A, and a portion of the refrigerant effluent is routed via conduit 15B to an intermediate expansion device 41 and another portion of the effluent, preferably the remainder of the effluent, is transported to the vapor injection heat exchanger 40.

In operation, the intermediate expansion device 41 lets the pressure of the effluent stream down, preferably substantially isoenthalpically, to about the pressure of the second stage suction of compressor 11 or sufficiently above such pressure to account for the pressure-drop through the heat exchanger 41 and associated conduits, fixtures and the like. As a result of the pressure drop across the expansion device 41, the temperature of the refrigerant flowing to the heat exchanger 40 is reduced relative to the temperature of the high pressure refrigerant which flows to the heat exchanger 40. Heat is transferred in the heat exchanger 40 from the high pressure stream to the stream that passed through the expansion valve 41. As a result, the temperature of the intermediate pressure stream which exits the heat exchanger 40 is higher, preferably by a temperature of at least about 5° C., than the temperature of the inlet stream, thereby producing a super-heated vapor stream that is transported to the second stage of the compressor 11 via conduit 19C.

As the higher pressure stream transported by conduit 15A travels through the heat exchanger 40 it loses heat to the lower pressure stream exiting expansion devise 41 and exits the heat exchanger through conduit 15C and then flows to receiver tank 18 which provides a reservoir of cold liquid refrigerant that is fed by way of a control valve (not shown) in conduit 19A into the evaporator 24. Ambient air to be cooled loses heat to the cold liquid refrigerant in the evaporator which in turn vaporizes the liquid refrigerant and produces refrigerant vapor with little or no super heat, and this vapor then flows to the first stage of compressor 11.

In preferred embodiments in which the refrigerant comprises at least about 90% by weight, preferably consisting essentially of, and preferably consisting of, HCFO-1233zd(E), the operating conditions correspond to the values described in the table below:

|  |  | PREFERRED RANGE |
|---|---|---|
| COMPRESSOR SUCTION | Pressure, kPa | 45-75 |
|  | Temperature, ° C. | 0°-10° |
| COMPRESSOR DISCHARGE | Pressure, kPa | 105-520 |
|  | Temperature, ° C. | 20°-70° |
| CONDENSER | Pressure, kPa | 105-520 |
|  | Temperature, ° C. | 10°-60° |
| EVAPORATOR | Pressure, kPa | 45-75 |
|  | Temperature, ° C. | 0°-10° |

In preferred embodiments in which the refrigerant comprises at least about 80% by weight, HFO-1234ze(E), and even more preferably 88% by weight of HFO-1234ze(E) and 12% by weight of HFC-227ea, the operating conditions correspond to the values described in the table below:

|  |  | PREFERRED RANGE |
|---|---|---|
| COMPRESSOR SUCTION | Pressure, kPa | 210-310 |
|  | Temperature, ° C. | 0°-10° |
| COMPRESSOR DISCHARGE | Pressure, kPa | 420-1600 |
|  | Temperature, ° C. | 20°-70° |
| CONDENSER | Pressure, kPa | 420-1600 |
|  | Temperature, ° C. | 10°-60° |
| EVAPORATOR | Pressure, kPa | 210-310 |
|  | Temperature, ° C. | 0°-10° |

EMBODIMENTS OF THE TYPE ILLUSTRATED IN FIG. 3

Figure 3:
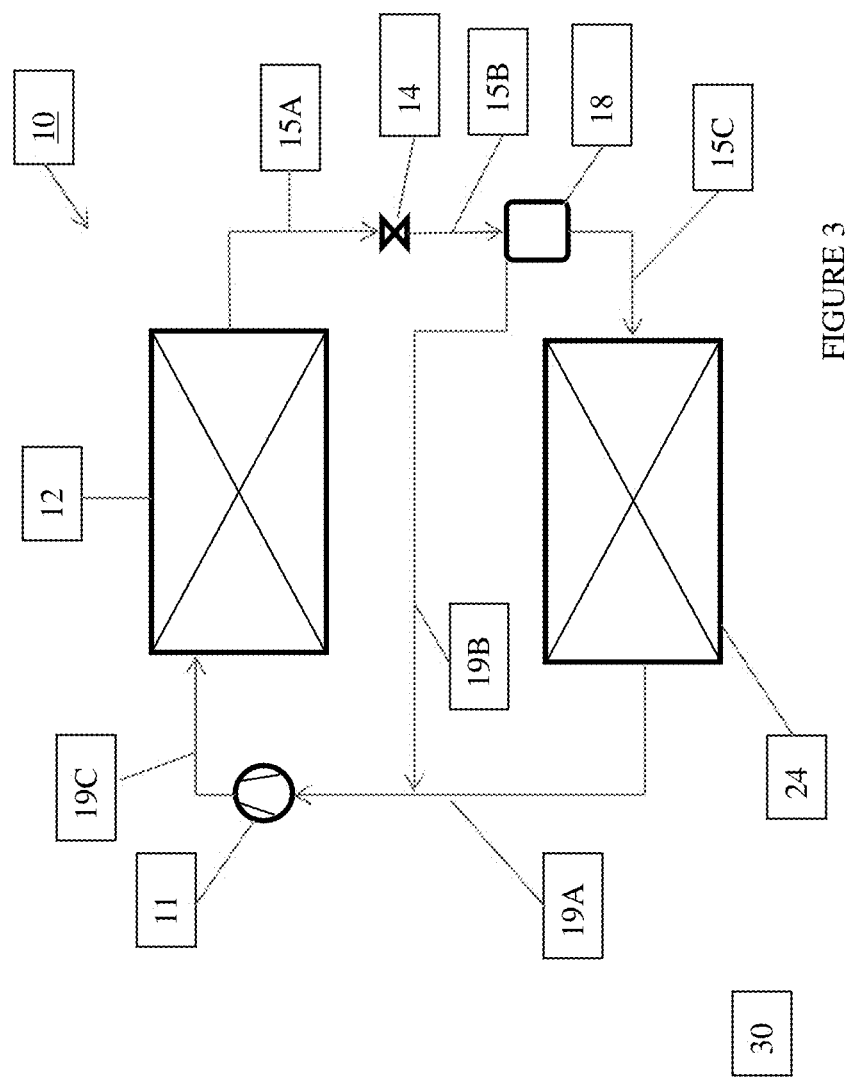
FIG. 3 is a generalized process flow diagram of another preferred embodiment of an air conditioning system according to the present invention.

A further preferred air conditioning system, designated generally at 10, is illustrated in FIG. 3. Such a preferred air conditioning system comprises a compressor 11, which may be a multi-stage compressor of the type as described herein but in the illustrated embodiment is shown as a single stage compressor, condenser 12, evaporator 24 (which is preferably a flooded evaporator in some embodiments), expansion valve 14, a flash gas separator 18, together with any of the associated conduits 15A-15C and 19A-19C and other connecting and related equipment (not shown and/or not labeled). In operation, the refrigerant according to the present invention is discharged from compressor 11 as a relatively high pressure refrigerant vapor, which may include entrained lubricant, and which then is transported via conduit 19C to condenser 12. In condenser 12 the refrigerant vapor transfers a portion of its heat, preferably via a phase change and preferably to ambient external air, and produces an effluent stream comprising at least partially, and preferably substantially fully, condensed refrigerant. The refrigerant effluent from the condenser 12 is transported via conduit 15A to expansion device 14. The lower pressure stream exiting expander 14 flows through conduit 15B to flash gas separator 18, which provides a reservoir of cold liquid refrigerant that is fed by way of a control valve (not shown) in conduit 15C into the evaporator 24. Ambient air to be cooled loses heat to the cold liquid refrigerant in the evaporator 24, which in turn vaporizes the liquid refrigerant and produces refrigerant vapor with little or no super heat, and this vapor then flows to the first stage of compressor 11. Flash gas generated during the pressure let-down in expansion device 14 then flows through conduit 19B to the suction side of the compressor 11.

In preferred embodiments in which the refrigerant comprises at least about 90% by weight, preferably consisting essentially of, and preferably consisting of, HCFO-1233zd (E), the operating conditions correspond to the values described in the table below:

| | | PREFERRED RANGE |
|---|---|---|
| COMPRESSOR SUCTION | Pressure, kPa | 45-75 |
| | Temperature, ° C. | 0°-10° |
| COMPRESSOR DISCHARGE | Pressure, kPa | 105-520 |
| | Temperature, ° C. | 20°-70° |
| CONDENSER | Pressure, kPa | 105-520 |
| | Temperature, ° C. | 10°-60° |
| EVAPORATOR | Pressure, kPa | 45-75 |
| | Temperature, ° C. | 0°-10° |

In preferred embodiments in which the refrigerant comprises at least about 80% by weight, HFO-1234zd(E), and even more preferably 88% by weight of HFO-1234ze(E) and 12% by weight of HFC-227ea, the operating conditions correspond to the values described in the table below:

| | | PREFERRED RANGE |
|---|---|---|
| COMPRESSOR SUCTION | Pressure, kPa | 210-310 |
| | Temperature, ° C. | 0°-10° |
| COMPRESSOR DISCHARGE | Pressure, kPa | 420-1600 |
| | Temperature, ° C. | 20°-70° |
| CONDENSER | Pressure, kPa | 420-1600 |
| | Temperature, ° C. | 10°-60° |
| EVAPORATOR | Pressure, kPa | 210-310 |
| | Temperature, ° C. | 0°-10° |

EMBODIMENTS OF THE TYPE ILLUSTRATED IN FIG. 4A

Figure 4A:
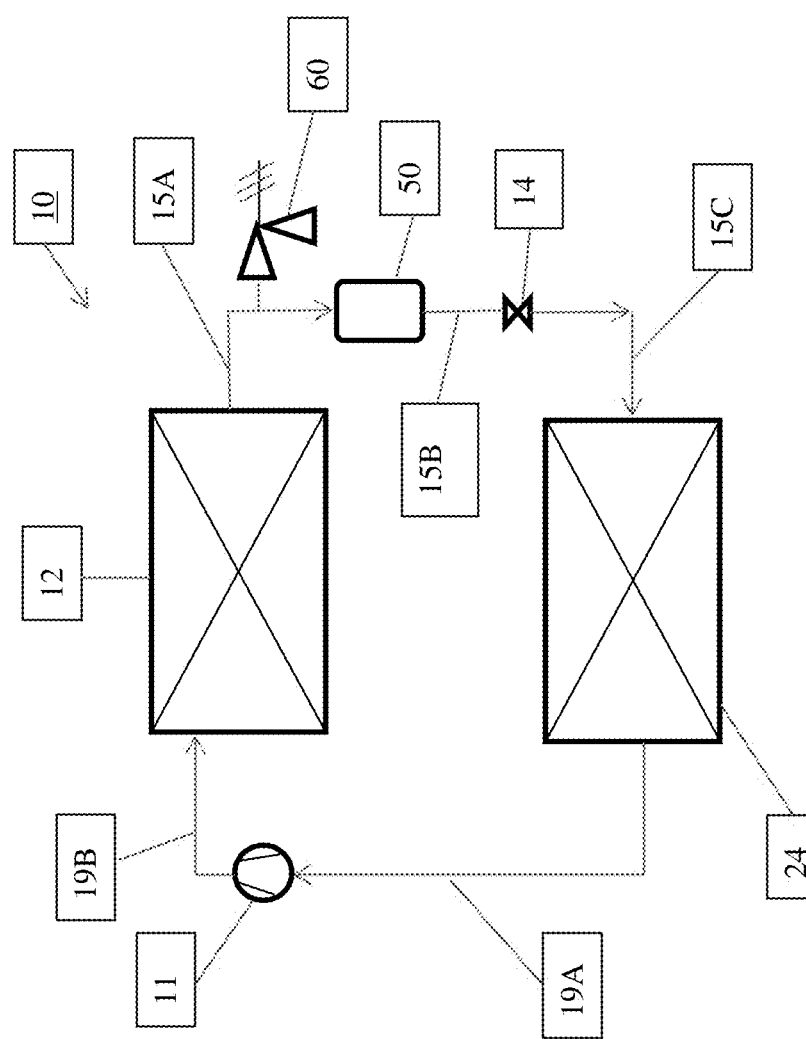
FIG. 4A is a generalized process flow diagram of another preferred embodiment of an air conditioning system according to the present invention.

In a further preferred air conditioning systems, designated generally at 10, is illustrated in FIG. 4A. Such a preferred air conditioning system comprises a compressor 11, which may be a multi-stage compressor of the type as described herein, condenser 12, evaporator 24 (which is preferably a flooded evaporator in some embodiments), expansion valve 14, a high pressure receiver, together with any of the associated conduits 15A-15C and 19A-19B and other connecting and related equipment (not shown and/or not labeled). In operation, the refrigerant according to the present invention is discharged from compressor 11 as a relatively high pressure refrigerant vapor, which may include entrained lubricant, and which then is transported via conduit 19B to condenser 12. In condenser 12 the refrigerant vapor transfers a portion of its heat, preferably via a phase change and preferably to ambient external air, and produces an effluent stream comprising at least partially, and preferably substantially fully, condensed refrigerant. The refrigerant effluent from the condenser 12 is transported via conduit 15A to a high pressure receiver 50, which provides a reservoir of liquid refrigerant. A sensor activated relief valve 60 is connected via a port or other form of connection to conduit 15A. The sensor activated relief valve includes and/or is in communication connection with, a sensor that monitors for flame, smoke, flammable gas concentration or other indicia that a flame is present or more likely to occur, said sensor being located in vicinity of some portion of the refrigeration system, preferably within the dwelling or other area being cooled. Since the preferred refrigerants of the present invention have flammability suppression properties, if the sensor detects flame and/or smoke (or other indicia of the existence of possibility or increased likelihood of fire), the sensor activated relief valve will open and release refrigerant into the area in which it is located, thus assisting with inhibition and/or elimination of the fire. The use of a high pressure receiver ensures that a relatively large reservoir of high pressure liquid refrigerant will be available in the event of such an emergency situation. The remainder of the refrigeration system can operate according to any one or more of the embodiments described herein.

EXAMPLES

Example 1—1233zd Without Suction Line Heat Exchanger

An air conditioning system according to a typical arrangement as shown in the figure labeled Prior Art uses a refrigerant consisting of HCFO-1233zd(E) according to the following parameters:

Operating Conditions
1—Evaporation temperature: 7° C.
2—Condensing temperature: Varying from 20° C. to 60° C.
3—Isentropic efficiency: Varying from 0.7 to 0.8
4—No subcooling or superheat Since the system of this example has no superheat in the vapor leaving the evaporator (which would be the case, for example, with a flooded evaporator), a saturated vapor enters the suction side of the centrifugal compressor. In normal operation with many other refrigerants, the isentropic or near isentropic expansion of the refrigerant vapor would produce a discharge gas with a temperature that represents at least about 5° C. of superheat at the discharge pressures. This degree of super heat is generally considered to be required in order to ensure safe and reliable operation of the compressor to ensure that a "wet vapor" does not exist in the compressor. For the system of the present example, operation at several levels of near isoentropic compression are evaluated to determine whether safe and reliable operation is achieved using HCFO-1233zd(E). These results are reported in Table 1 below:

TABLE 1

| | Compressor discharge superheat-° C. | | | |
|---|---|---|---|---|
| Condensing temperature [° C.] | Isentropic efficiency: 1 | Isentropic efficiency: 0.80 | Isentropic efficiency: 0.75 | Isentropic efficiency: 0.70 |
| 20° | Wet vapor | 2.46 | 3.37 | 4.41 |
| 25° | Wet vapor | 3.11 | 4.33 | 5.73 |
| 30° | Wet vapor | 3.61 | 5.13 | 6.87 |
| 35° | Wet vapor | 3.98 | 5.78 | 7.83 |
| 40° | Wet vapor | 4.22 | 6.28 | 8.63 |
| 45° | Wet vapor | 4.34 | 6.65 | 9.28 |
| 50° | Wet vapor | 4.36 | 6.9 | 9.79 |
| 55° | Wet vapor | 4.29 | 7.04 | 10.17 |
| 60° | Wet vapor (2.5% liquid in discharge) | 4.13 | 7.07 | 10.43 |

As can be seen from the results reported in Table 1 above, when the most efficient compressor is used (isentropic efficiency=1), the vapor which exists the compressor includes at least some proportion of liquid, thus producing a wet vapor discharge, which as described above has serious negative implications for efficient and/or reliable operation. When compressor efficiency is decreased to 0.8, the desired level of super heat is still not achieved for any of the tested condenser temperatures. Even when compressor efficiency is decreased to 0.75 and 0.7, which itself is not a preferred option, the desirable level of super heat is not achieved for the entire range of condenser temperature conditions.

Example 2A—1233zd With Suction Line Heat Exchanger

An air conditioning system according to an arrangement according to the present invention using a suction line heat exchanger (SLHX) as illustrated in FIG. 1 and using a refrigerant consisting of HCFO-1233zd(E) is tested according to the same operating parameters of Example 1 for a single stage compressor operating at 80% isentropic efficiency. Several levels of heat exchanger efficiencies for the suction line heat exchanger are examined, and the results are reported in Table 2A below:

TABLE 2A

| | Compressor discharge superheat [° C.] at 80% isentropic efficiency | | |
|---|---|---|---|
| Condensing temperature [° C.] | SLHX effectiveness 0.3 | SLHX effectiveness 0.5 | SLHX effectiveness 0.7 |
| 20° | 6.47 | 9.13 | 11.78 |
| 25° | 8.71 | 12.42 | 16.11 |
| 30° | 10.82 | 15.6 | 20.35 |
| 35° | 12.83 | 18.67 | 24.48 |
| 40° | 14.72 | 21.65 | 28.52 |
| 45° | 16.51 | 24.53 | 32.47 |
| 50° | 18.22 | 27.32 | 36.33 |
| 55° | 19.83 | 30.03 | 40.11 |
| 60° | 21.37 | 32.66 | 43.82 |

As can be seen from the results as reported above, operation according to the embodiment of the invention as illustrated in FIG. 1 produces at least about 5° C. of superheat at the compressor discharge for the whole range of condensing temperatures tested.

Example 2B Azeotropes with R1233zd

Example 2A is repeated except that a series of azeotropic refrigerant blends based on HCFO-1233zd(E) as described in Table 2B below are used in place of the refrigerant consisting of only 1233zd(E) as used in Example 2A. Acceptable operation is achieved.

In addition, the transport properties of these additional refrigerants is tested, together with the properties of refrigerant consisting of HCFO-1233zd(E), and are reported below in Table 2B.

TABLE 2B

| Refrigerant | Flammability | Liquid Thermal Conductivity (mW/m-K) | Vapor Thermal Conductivity (mW/m-K) | Liquid Viscosity (µPa-s) | Vapor Viscosity (µPa-s) |
|---|---|---|---|---|---|
| 1233zd(E) (100%) | Non-flammable | 80.2 (100%) | 9.2 (100%) | 605.5 (100%) | 10.4 (100%) |
| n-Pentane/1233zd(E) (2.8%/97.2%) | Non-flammable | 82.2 (103%) | 9.4 (102%) | 572.3 (95%) | 10.1 (97%) |
| Iso-Pentane/1233zd(E) (4.6%/95.4%) | Non-Flammable | 83.0 (104%) | 9.6 (104%) | 549.1 (91%) | 10.0 (96%) |
| Neo-pentane/1233zd(E) (4.0%/96.0%) | Non-flammable | 81.5 (102%) | 9.6 (104%) | 557.3 (92%) | 10.1 (97%) |

Example 3A—1233zd With Suction Line Heat Exchanger

An air conditioning system according to the present invention as illustrated in FIG. 1 is tested using a suction line heat exchanger (SLHX) with an SLHX effectiveness of 0.5 and 0.7 and using a refrigerant consisting of HCFO-1233zd (E) is tested according to the same operating parameters of Example 1. This testing provides a comparison of the relative effectiveness of such systems with the system described in Example 1 (both systems using a compressor efficiency of 80%) which does not use a SLHX, and this comparison is reported in Table 3A below:

TABLE 3A

| Condensing temperature [° C.] | Cooling COP of system with SLHX [% of system without SLHX] | |
|---|---|---|
| | Suction line heat exchanger effectiveness: 0.5 | Suction line heat exchanger effectiveness: 0.7 |
| 20° | 100.20 | 100.29% |
| 25° | 100.40 | 100.58% |
| 30° | 100.68 | 100.98% |
| 35° | 101.04 | 101.48% |
| 40° | 101.49 | 102.13% |
| 45° | 102.05 | 102.90% |
| 50° | 102.73 | 103.86% |
| 55° | 103.53 | 104.94% |
| 60° | 104.47 | 106.27% |

As can be seen from the results reported above in Table 3A, in addition to overcoming the wet vapor problem, the system according to the configuration of FIG. 1 produce an improvement in overall system efficiency (COP) for all tested conditions.

Example 4A—1233zd With Multi-Stage Compressor

An air conditioning system according the present invention using a two stage compressor according to the system configuration as illustrated in FIG. 2 using a refrigerant consisting of HCFO-1233zd(E) is tested over a series of condensing temperatures ranging from 30 C to 60 C. The operating conditions for the compressor at an isentropic efficiency of 80% and an evaporator temperature of 7 C. for each of these condenser temperatures is reported in Table 4A1:

TABLE 4A1

| Condensing temperature [° C.] | Compressor inlet temperature [kPa] | Intermediate pressure [kPa] | Discharge pressure [kPa] |
|---|---|---|---|
| 30 | 64.6 | 100 | 155 |
| 35 | 64.6 | 109 | 183 |
| 40 | 64.6 | 118 | 216 |
| 45 | 64.6 | 128 | 252 |
| 50 | 64.6 | 138 | 293 |
| 55 | 64.6 | 148 | 340 |
| 60 | 64.6 | 159 | 390 |

The same air conditioning using the multi-stage compressor arrangement as illustrated in FIG. 2 using a refrigerant consisting of HCFO-1233zd(E) is tested and compared to a single compressor stage operating according to the configuration in Example 1. In addition, the same set of comparative tests are run for the refrigerant consisting of R11. The results of these comparative tests are reported in Table 4A2 below:

TABLE 4A2

| | R1233zd(E)(E) | | R11 | |
|---|---|---|---|---|
| | COP | % Compared to Single Stage | COP | % Compared to Single Stage |
| Single stage | 3.78 | 100.0% | 4.01 | 100.0% |
| Two-stage | 4.17 | 110.4% | 4.28 | 106.9% |
| Three-stage | 4.36 | 115.5% | 4.41 | 110.1% |

As can be seen from the results reported above, a dramatic improvement in system efficiency (COP) is realized utilizing the configuration of the present invention, according to the embodiments of the type illustrated in FIG. 2 is realized as a result of using 2 and 3 stage compression, in amounts up to 115% improvement. In addition, the test results reported above indicate that the use of HCFO-1233zd(E) in both a two-stage and a three-stage compressor operation produces a substantially better improvement in efficiency (COP) compared to the improvement which is realized in the same system but utilizing R-11.

Example 5—1233zd and 1233zd Blends With Flash Gas Separator

An air conditioning system according to an arrangement according to the present invention using a flash gas separator as illustrated in FIG. 3 and using a refrigerant consisting of HCFO-1233zd(E) and the blends identified in Table 5 below are s tested according to the same operating parameters of Example 1 for a single stage compressor operating at 80% isentropic efficiency. The evaporator is operated in flooded configuration and results in a reduced pressure drop across the evaporator and hence a higher suction pressure in the compressor. In addition, since the since the pressure in the system is relatively low as a result of the use of a refrigerant consisting of HCFO-1233zd(E) and the blends in Table 5, compact heat exchangers made from low cost materials can be use. For example, round tube-fin and/or microchannel heat exchangers could be made of aluminum instead of copper. This configuration offers superior heat transfer performance, low weight and compact heat transfer systems.

Example 6—1233zd(E) and 1233zd(E) Blends With Sensor Activated Relief Valve

Figure 4B:
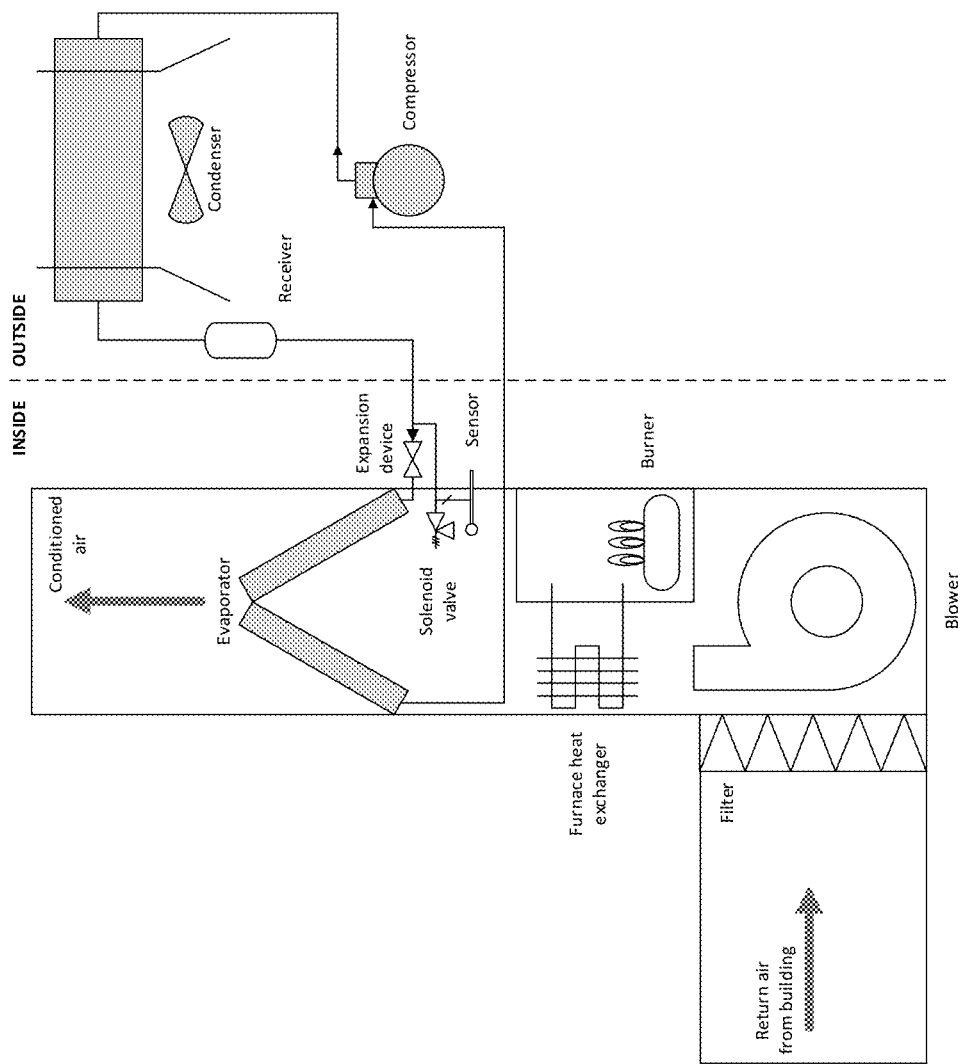
FIG. 4B is a more specific process flow diagram of a preferred embodiment of an air conditioning system having a flame suppression feature according to one aspect of the present invention.

An air conditioning system according to an arrangement according to the present invention using a sensor activated relief valve as illustrated in FIGS. 4A and 4B and using a refrigerant consisting of HCFO-1233zd(E) and each of the refrigerants disclosed in Table 2B is tested. The sensor activated relief valve is preferably a solenoid type valve. The sensor that is used measures the natural gas concentration in a residential furnace unit. In case of a fuel leak, such as for example a natural gas leak, of the burner set up of the furnace the sensor would detect elevated gas concentrations, for example 1000 ppm, activating the solenoid valve. The activated valve would open and release the R1233zd(E) into this flammable natural gas atmosphere. Due to the fire suppressing properties of the R1233zd(E) the likeliness of a fire would be reduced by inhibiting and/or eliminating the fire condition in proximity to the relief valve which is located in proximity to the sensed flammable atmosphere. Thus, fire conditions or conditions indicating an increased likelihood of a fire is detected by the sensor and the relief valve is opened, inhibiting and/or eliminating the fire condition in proximity to the relief valve which is located in proximity to the sensed flame and/or sensed condition.

Example 7A—1234ze(E) Blends Without Suction Line Heat Exchanger

An air conditioning system according to a typical arrangement as shown in the figure labeled Prior Art uses a refrigerant consisting of about 88% by weight of HFO-1234ze(E) and about 12% by weight of R227ea according to the following parameters:

Operating Conditions—Prior Art
1—Evaporation temperature: 7° C.
2—Condensing temperature: Varying from 20° C. to 60° C.
3—Isentropic efficiency: 0.7-0.8
4—No subcooling or superheat Since the system of this example has no superheat in the vapor leaving the evaporator (which would be the case, for example, with a flooded evaporator), a saturated vapor enters the suction side of the centrifugal compressor. In normal operation with many other refrigerants, the isentropic or near isentropic expansion of the refrigerant vapor would produce a discharge gas with a temperature that represents at least about 5° C. of superheat at the discharge pressures. This degree of super heat is generally considered to be required in order to ensure safe and reliable operation of the compressor to ensure that a "wet vapor" does not exist in the compressor. For the system of the present example, operation at several levels of near isoentropic compression are evaluated to determine whether safe and reliable operation is achieved using the above-noted blend of HFO-1234ze(E) and R-227ea. These results are reported in Table 7A below:

TABLE 7A

| Condensing temperature [° C.] | Compressor discharge superheat [° C.] | | |
|---|---|---|---|
| | Isentropic efficiency: 0.70 | Isentropic efficiency: 0.75 | Isentropic efficiency: 0.80 |
| 20° | 2.65 | 1.87 | 1.19 |
| 25° | 3.41 | 2.38 | 1.47 |
| 30° | 4.06 | 2.79 | 1.68 |
| 35° | 4.6 | 3.12 | 1.82 |
| 40° | 5.06 | 3.39 | 1.93 |
| 45° | 5.45 | 3.61 | 2 |
| 50° | 5.78 | 3.79 | 2.06 |
| 55° | 6.07 | 3.96 | 2.12 |
| 60° | 6.34 | 4.13 | 2.21 |

As can be seen from the results reported in Table 7 above, all but five of the conditions tested fail to produce the minimum level of 5° C. superheat in the compressor discharge, and the conditions which do produce more than this minimum of super heat use the undesirably low isentropic efficiency of 0.7 at high condenser temperatures.

Example 7B—1234ze Blend With Suction Line Heat Exchanger

An air conditioning system according to an arrangement according to the present invention using a suction line heat exchanger (SLHX) as illustrated in FIG. 1 and using a refrigerant consisting of about 88% by weight of HFO-1234ze(E) and about 12% by weight of R227ea is tested according to the same operating parameters of Example 7 for a single stage compressor operating at 80% isentropic efficiency. Several levels of heat exchanger efficiencies for the suction line heat exchanger are examined, and the results are reported in Table 7B below:

TABLE 7B

| Condensing temperature [° C.] | Compressor discharge superheat [° C.] at 80% isentropic efficiency | | |
|---|---|---|---|
| | SLHX effectiveness 0.3 | SLHX effectiveness 0.5 | SLHX effectiveness 0.7 |
| 20 | 5.11 | 7.72 | 10.32 |
| 25 | 6.9 | 10.51 | 14.12 |
| 30 | 8.61 | 13.23 | 17.84 |
| 35 | 10.25 | 15.86 | 21.47 |
| 40 | 11.83 | 18.43 | 25.03 |
| 45 | 13.35 | 20.94 | 28.53 |
| 50 | 14.82 | 23.38 | 31.96 |
| 55 | 16.26 | 25.78 | 35.33 |
| 60 | 17.66 | 28.13 | 38.65 |

As can be seen from the results as reported in Table 7B above, operation according to the embodiment of the invention as illustrated in FIG. 1 produces at least about 5° C. of superheat at the compressor discharge for the whole range of condensing temperatures tested.

Example 7C—1234ze Blend With Suction Line Heat Exchanger

An air conditioning system according to the present invention as illustrated in FIG. 1 is tested using a suction line heat exchanger (SLHX) with an SLHX effectiveness of 0.5 and 0.7 and using a refrigerant consisting of about 88% by weight of HFO-1234ze(E) and about 12% by weight of R227ea is tested according to the same operating parameters of Example 7A. This testing provides a comparison of the relative effectiveness of such systems with the system described in Example 7A (both systems using a compressor efficiency of 80%) which does not use a SLHX, and this comparison is reported in Table 7C below:

TABLE 7C

| Condensing temperature [° C.] | Cooling COP of system with SLHX [% of system without SLHX] | |
|---|---|---|
| | Suction line heat exchanger effectiveness: 0.5 | Suction line heat exchanger effectiveness: 0.7 |
| 20 | 100.50% | 100.73% |
| 25 | 100.88% | 101.27% |
| 30 | 101.39% | 101.99% |
| 35 | 102.04% | 102.90% |
| 40 | 102.84% | 104.04% |
| 45 | 103.87% | 105.46% |
| 50 | 105.13% | 107.21% |
| 55 | 106.72% | 109.39% |
| 60 | 108.67% | 112.05% |

As can be seen from the results reported above in Table 7C, in addition to overcoming the wet vapor problem, the systems according to the configuration of FIG. 1 produce an improvement in overall system efficiency (COP) for all tested conditions.

Example 8A—1234ze Blend With MultiStage Compressor

An air conditioning system according the present invention using a two stage compressor and a three stage compressor according to the system configurations as illustrated in FIG. 2 using a refrigerant consisting of about 88% by weight of HFO-1234ze(E) and about 12% by weight of R227ea is tested and compared to a single compressor stage operating according to the configuration in Example 1. In addition, the same set of comparative tests are run for the refrigerant consisting of R134a. The results of these comparative tests are reported in Table 8A below:

TABLE 8A

|  | R1234ze(E)/R227ea (0.88/0.12) | | R134a | |
| --- | --- | --- | --- | --- |
| Single stage | 3.38 | 100.0% | 3.44 | 100.0% |
| Two-stage | 3.92 | 116% | 3.93 | 116.0% |
| Three-stage | 4.10 | 121.3% | 4.09 | 118.9% |

As can be seen from the results reported above, a dramatic improvement in system efficiency (COP) is realized utilizing the configuration of the present invention, according to the embodiments of the type illustrated in FIG. 2 as a result of using 2 and 3 stage compression, in amounts up to 115% improvement. In addition, the test results reported above indicate that the use of the HFCO-1234ze(E)/227ea blend in both a two-stage and a 3 stage compressor operation produces a substantially better improvement in efficiency (COP) compared to the improvement which is realized in the same system but utilizing R134a.

Example 9

In each of the Examples above the system includes plastic components that in operation are in contact with the refrigerant. These materials from which these components are made are compatible and/or stable. Applicants have tested the stability of various plastic materials when exposed to transHFCO-1233zd. Testing comprises submerging samples of various plastics in transHFCO-1233zd under ambient pressure conditions at room temperature (approximately 24° C.-25° C.) for two (2) weeks, after which the samples were removed from the transHFCO-1233zd and allowed to outgas for 24 hours. The results are reported in Table 9 below:

TABLE 9

| SUBSTRATE (Plastics) | AVE % WT. Δ | AVE % VOL. Δ |
| --- | --- | --- |
| ABS | 3.35% | 3.55% |
| DELRIN ® | 0.54% | 0.61% |
| HDPE | 1.70% | 1.19% |
| NYLON 66 | −0.09% | −0.09% |
| POLYCARBONATE | 3.55% | 2.98% |
| ULTEM ® Polyetherimide | 0.035% | −0.52% |
| KYNAR ® PVDF | 0.13% | −0.27% |
| TEFLON ® | 2.13% | 3.93% |
| POLYPROPYLENE | 4.96% | 3.68% |
| PVC-TYPE 1 | 0.10% | 0.04% |
| PET | 0.08% | 0.015% |

As illustrated by the results in Table 5 above, the average percent volume change for each of the tested plastic materials is less than 5%.

What is claimed is:

1. A refrigeration system having a heat source to be cooled and a heat sink into which heat can be rejected, said system having a capacity of from about 2 to about 30 tons and comprising:

(a) a heat transfer composition comprising a refrigerant comprising at least about 95% by weight of trans1-chloro-3,3,3-trifluoropropene (trans1233zd) or at least about 80% by weight of trans1,3,3,3-tetrafluoropropene (transHFO-1234ze);

(b) a centrifugal compressor having a refrigerant suction for receiving low-pressure refrigerant vapor at a pressure of from about 40 to about 350 kPa and a refrigerant discharge for discharging high pressure refrigerant vapor at a pressure of at discharge:suction pressure ration of least about 2:1, wherein said compressor has an efficiency of at least about 0.65;

(c) a condenser fluidly connected to said refrigerant discharge of said compressor for receiving said high pressure refrigerant vapor and condensing at least a substantial portion of said refrigerant vapor by heat transfer with said heat sink to produce high pressure refrigerant liquid at temperature in the range of from about 10° C. to about 60° C.;

(d) an expander fluidly connected to said condenser for substantially isoenthalpically reducing the pressure of said high pressure refrigerant liquid to produce low pressure refrigerant liquid at a pressure of from about 40 to about 350 kPa;

(e) an evaporator fluidly connected to said expander for receiving said low pressure refrigerant liquid and evaporating said low pressure refrigerant liquid by absorbing heat from said source to be cooled to produce a low pressure refrigerant vapor at a pressure of from about 40 to about 350 kPa; and (f) at least one heat exchanger fluidly connected between said evaporator and said refrigerant suction of said compressor, said at least one heat exchanger receiving at least a portion of said low pressure refrigerant vapor from said evaporator and heating said low pressure refrigerant vapor to produce a low pressure refrigerant vapor having a temperature at least about 5° C. greater than the temperature of the vapor entering said at least one heat exchanger, said high temperature refrigerant vapor from said at least one heat exchanger fluidly connected to said compressor suction for providing low-pressure refrigerant vapor to said compressor.

2. The refrigeration system of claim 1 wherein said refrigerant comprises at least about 80% by weight of trans1,3,3,3-tetrafluoropropene (transHFO-1234ze).

3. The refrigeration system of claim 1 wherein said refrigerant comprises at least about 95% by weight of trans1-chloro-3,3,3-trifluoropropene (trans1233zd).

4. The refrigeration system of claim 1 wherein said refrigerant has a Class A toxicity according to ASHRAE Standard 2013 and a flammability of Class 1 or Class 2 or Class 2L according to ASHRAE Standard 34-2013 and described in Appendix B1 to ASHRAE Standard 34-2013.

5. The refrigeration system of claim 1 wherein said refrigerant comprises trans1,3,3,3-tetrafluoropropene (transHFO-1234ze) and 1,1,1,2,3,3,3-heptafluoropropane (HFC-227ea).

6. The refrigeration system of claim 5 wherein said refrigerant comprises from about 85% to about 90% by weight of trans1,3,3,3-tetrafluoropropene (transHFO-1234ze) and from about 10% to about 15% by weight of and 1,1,1,2,3,3,3-heptafluoropropane (HFC-227ea).

7. The refrigeration system of claim 6 wherein said refrigerant comprises about 88% by weight of trans1,3,3,3-tetrafluoropropene (transHFO-1234ze) and about 12% by weight of and 1,1,1,2,3,3,3-heptafluoropropane (HFC-227ea).

8. The refrigeration system of claim 6 wherein said refrigerant consists essentially of trans1,3,3,3-tetrafluoropropene (transHFO-1234ze) and 1,1,1,2,3,3,3-heptafluoropropane (HFC-227ea).

9. The refrigeration system of claim 6 wherein said refrigerant consists essentially of from about 85% to about 90% by weight of trans1,3,3,3-tetrafluoropropene (transHFO-1234ze) and from about 10% to about 15% by weight of 1,1,1,2,3,3,3-heptafluoropropane (HFC-227ea).

10. A refrigeration system having a heat source to be cooled and a heat sink into which heat can be rejected, said system having a capacity of from about 2 to about 30 tons and comprising:
(a) a heat transfer composition comprising a refrigerant comprising at least about 80% by weight of trans1,3,3,3-tetrafluoropropene (transHFO-1234ze);
(b) a centrifugal compressor having a refrigerant suction for receiving low-pressure refrigerant vapor at a pressure of from about 210 to about 310 kPa and discharge for discharging high pressure refrigerant vapor at a pressure of from about 420 to about 1600 kPa, said compressor having an efficiency of at least about 0.65;
(c) a condenser fluidly connected to said refrigerant discharge of said compressor for receiving said high pressure refrigerant vapor and condensing at least a substantial portion of said refrigerant vapor by heat transfer with said heat sink to produce high pressure refrigerant liquid at temperature in the range of from about 10° C. to about 60° C.;
(d) an expander fluidly connected to said condenser for substantially isoenthalpically reducing the pressure of said high pressure refrigerant liquid to produce low pressure refrigerant liquid at a pressure of from about 210 to about 310 kPa;
(e) an evaporator fluidly connected to said expander for receiving said low pressure refrigerant liquid and evaporating said low pressure refrigerant liquid by absorbing heat from said source to be cooled to produce a low pressure refrigerant vapor at a pressure of from about 210 to about 3100 kPa; and
(f) at least one heat exchanger fluidly connected between said evaporator and said refrigerant suction of said compressor, said at least one heat exchanger receiving at least a portion of said low pressure refrigerant vapor from said evaporator and heating said low pressure refrigerant vapor to produce a low pressure refrigerant vapor having a temperature at least about 5° C. greater than the temperature of the vapor entering said at least one heat exchanger, said high temperature refrigerant vapor from said at least one heat exchanger fluidly connected to said compressor suction for providing low-pressure refrigerant vapor to said compressor.

11. The refrigeration system of claim 10 wherein said refrigerant comprises trans1,3,3,3-tetrafluoropropene (transHFO-1234ze) and 1,1,1,2,3,3,3-heptafluoropropane (HFC-227ea).

12. The refrigeration system of claim 10 wherein said refrigerant comprises from about 85% to about 90% by weight of trans1,3,3,3-tetrafluoropropene (transHFO-1234ze) and from about 10% to about 15% by weight of 1,1,1,2,3,3,3-heptafluoropropane (HFC-227ea).

13. The refrigeration system of claim 10 wherein said refrigerant comprises about 88% by weight of trans1,3,3,3-tetrafluoropropene (transHFO-1234ze) and about 12% by weight of 1,1,1,2,3,3,3-heptafluoropropane (HFC-227ea).

14. The refrigeration system of claim 10 wherein said refrigerant consists essentially of trans1,3,3,3-tetrafluoropropene (transHFO-1234ze) and 1,1,1,2,3,3,3-heptafluoropropane (HFC-227ea).

15. The refrigeration system of claim 10 wherein said refrigerant consists essentially of from about 85% to about 90% by weight of trans1,3,3,3-tetrafluoropropene (transHFO-1234ze) and from about 10% to about 15% by weight of 1,1,1,2,3,3,3-heptafluoropropane (HFC-227ea).

16. The refrigeration system of claim 10 wherein said refrigerant consists essentially of about 88% by weight of trans1,3,3,3-tetrafluoropropene (transHFO-1234ze) and about 12% by weight of 1,1,1,2,3,3,3-heptafluoropropane (HFC-227ea).

17. The refrigeration system of claim 10 wherein said refrigerant consists of trans1,3,3,3-tetrafluoropropene (transHFO-1234ze) and 1,1,1,2,3,3,3-heptafluoropropane (HFC-227ea).

18. The refrigeration system of claim 10 wherein said refrigerant consists of from about 85% to about 90% by weight of trans1,3,3,3-tetrafluoropropene (transHFO-1234ze) and from about 10% to about 15% by weight of 1,1,1,2,3,3,3-heptafluoropropane (HFC-227ea).

19. The refrigeration system of claim 10 wherein said refrigerant consists of about 88% by weight of trans1,3,3,3-tetrafluoropropene (transHFO-1234ze) and about 12% by weight of 1,1,1,2,3,3,3-heptafluoropropane (HFC-227ea).

20. The method of claim 10 wherein said refrigerant has a Class A toxicity according to ASHRAE Standard 2013 and a flammability of Class 1 or Class 2 or Class 2L according to ASHRAE Standard 34-2013 and described in Appendix B1 to ASHRAE Standard 34-2013.

* * * * *